July 7, 1964
C. J. IBEX
3,139,843
CONTAINER FORMING MOLDS
Original Filed Dec. 5, 1960
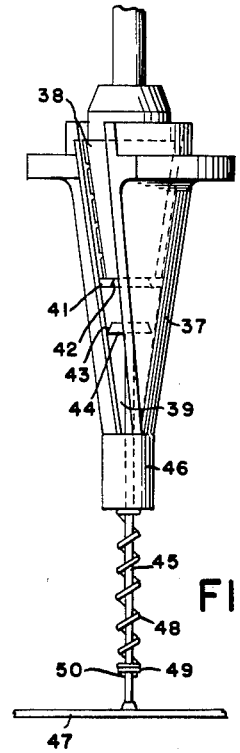
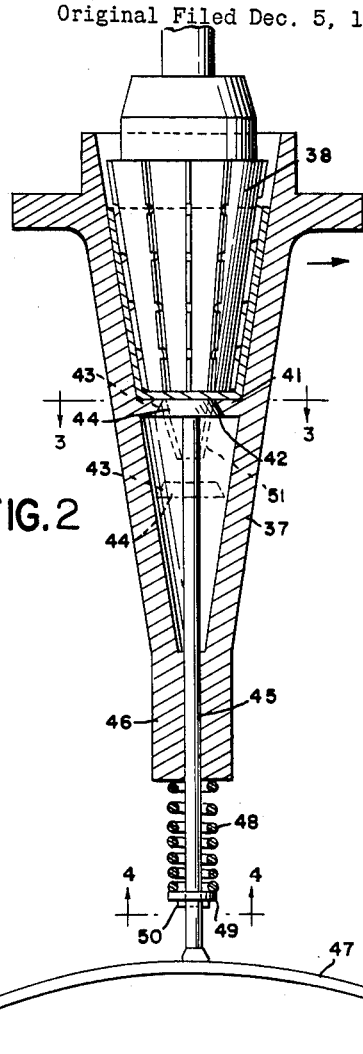
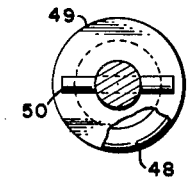
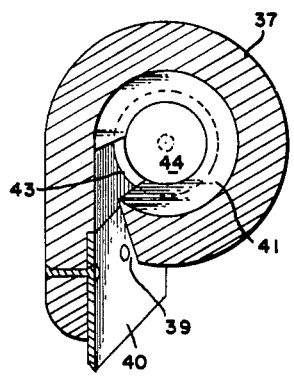
FIG. 1
FIG. 2
FIG. 3
FIG. 4
INVENTOR.
CHARLES J. IBEX
BY
Albert J. Kramer
ATTORNEY

United States Patent Office 3,139,843
Patented July 7, 1964

3,139,843
CONTAINER FORMING MOLDS
Charles J. Ibex, Baltimore, Md., assignor to The Maryland Baking Co., Baltimore, Md., a corporation of Maryland
Original application Dec. 5, 1960, Ser. No. 73,633, now Patent No. 3,086,484, dated Apr. 23, 1963. Divided and this application Oct. 4, 1962, Ser. No. 233,170
3 Claims. (Cl. 107—8)

This is a division of my copending application for patent, Serial No. 73,633, filed December 5, 1960, now Patent No. 3,086,484, issued April 23, 1963.

This invention relates to edible pastry containers, such as those conventionally used for holding frozen confections, including ice cream, sherberts, etc., and it is more particularly concerned with the manufacture of such containers in the form of a frusto-conical shell with a flat bottom.

An object of this invention is the provision of a hollow mold for receiving on its interior a baked thermoplastic wafer from an exterior source and a cooperating spinner on the interior of the mold for grasping the wafer and spinning it within the mold to form the desired flat-bottomed container.

The use of thermoplastic wafers to form edible pastry containers have, heretofore, been limited to the conical form of container, while the flat-bottomed containers have been manufactured by the use of a thin batter poured into molds and heated until the batter is baked and becomes rigid to the form of the mold.

The present invention, therefore, comprises a departure from the prior art in making it possible to manufacture flat-bottomed edible containers by the use of thermoplastic wafers.

Another object of the invention is the modification of a conventional type of mold and cooperating spinner used to manufacture conical containers in such a way as to render it capable of manufacturing a flat-bottomed container.

Other objects of the invention will appear more fully from the following description considered together with the accompanying drawing.

In the drawing:

FIG. 1 is an elevational view of the hollow mold and spinner in operative relation looking into the mold through the wafer inlet slot.

FIG. 2 is a vertical sectional view of the mold and spinner therein on a larger scale.

FIG. 3 is a sectional view along the line 3—3 of FIG. 2.

FIG. 4 is a sectional view along the line 4—4 of FIG. 2 of the lower portion of the mold.

Referring with more particularity to the drawing, the embodiment illustrated comprises a hollow conical mold 37 adapted to be conventionally mounted on a rotating wheel (not shown) of a conventional "sugar cone" machine (not shown). See said Patent No. 3,086,484.

The mold is provided with a wafer inlet slot 39 for a wafer and scraper blade 40. The inner wall of the mold comprises a ledge 41 extending around the wall from one side of the slot 39 to the other where the bottom wall of the container is to be formed.

The inner edge of the ledge 41 is undercut to provide a downwardly facing bevel edge 42 which registers with the upwardly facing bevel edge 43 of a vertically movable plate 44.

The plate 44 is secured to the upper end of a stem or rod 45 which is slidably engaged with a bearing 46 formed in the bottom of the mold. The lower end of the rod slidably negages a stationary cam track 47 by means of which it is moved to its upper position when the mold moves relative to the track.

A return spring 48 is disposed about the stem 45 between the bottom of the mold and a retainer 49 held by a pin 50 at the bottom of the stem.

The parts are proportioned so that the diameter of the plate 44 results in its lowermost position being just below the wafer as the wafer enters the mold through the slot 39. As the wafer thus enters the mold, a central conical tail portion 51 is formed below the ledge 41 over the plate 44. The plate then moves up to flatten this tail portion against the bottom of the spinner 38 and thus forms a continuous bottom with the ledge for completing the formation of the bottom of the cup. The formed cup is then removed from the mold by conventional means, as explained above in connection with the first embodiment, and the plate 44, moving past the cam track 47 is returned to its initial position by the spring 48.

I claim:

1. In a machine for manufacturing pastry containers having a hollow mold, said mold having a conical inner wall and a longitudinal inlet slot for passage of wafers from the exterior to the interior of the mold, and a cooperating frusto-conical spinner conforming to the upper part of the mold for engaging a wafer on the interior of the mold, a ledge integral with the inner wall of the mold extending around the mold from one side of the slot to the other at a position above the apex of the mold where the bottom of the container is to be formed, a circular plate adapted to engage the inner edge of the ledge in operative position and to move downwardly therefrom to a non-operative position between the ledge and the apex below the position of wafers entering the mold through the slot, and means for moving the plate between the operative and inoperative positions.

2. A mold for forming a flat-bottomed pastry cup comprising a hollow female mold part having a conical inner wall and a longitudinal slot for the passage of wafers to be formed into cups, a ledge integral with the inner wall extending around the mold from one side of the slot to the other at a position in the mold where the bottom of the cup is to be formed, a circular plate within the mold between the apex and the ledge, adapted to engage the inner edge of the ledge in operative position and to be disposed in its inoperative position below the ledge at a position below wafers entering the mold through the slot, a stem secured to the bottom of the plate, and a bearing in the bottom of the mold for slidably supporting the stem.

3. A mold as defined by claim 2 in which the adjacent edges of the ledge and plate are provided with complementary beveled edges.

References Cited in the file of this patent
UNITED STATES PATENTS 2,745,363    Salton _____ May 15, 1956
3,086,484    Ibex _____ May 23, 1963